(No Model.) 3 Sheets—Sheet 1.

H. H. SPRAGUE.
GAS METER.

No. 517,368. Patented Mar. 27, 1894.

Witnesses,
W. C. Corbies
S. M. Brainard.

Inventor,
Henry H. Sprague.
By Coburn & Thacher
Attys.

THE NATIONAL LITHOGRAPHING COMPANY,
WASHINGTON, D. C.

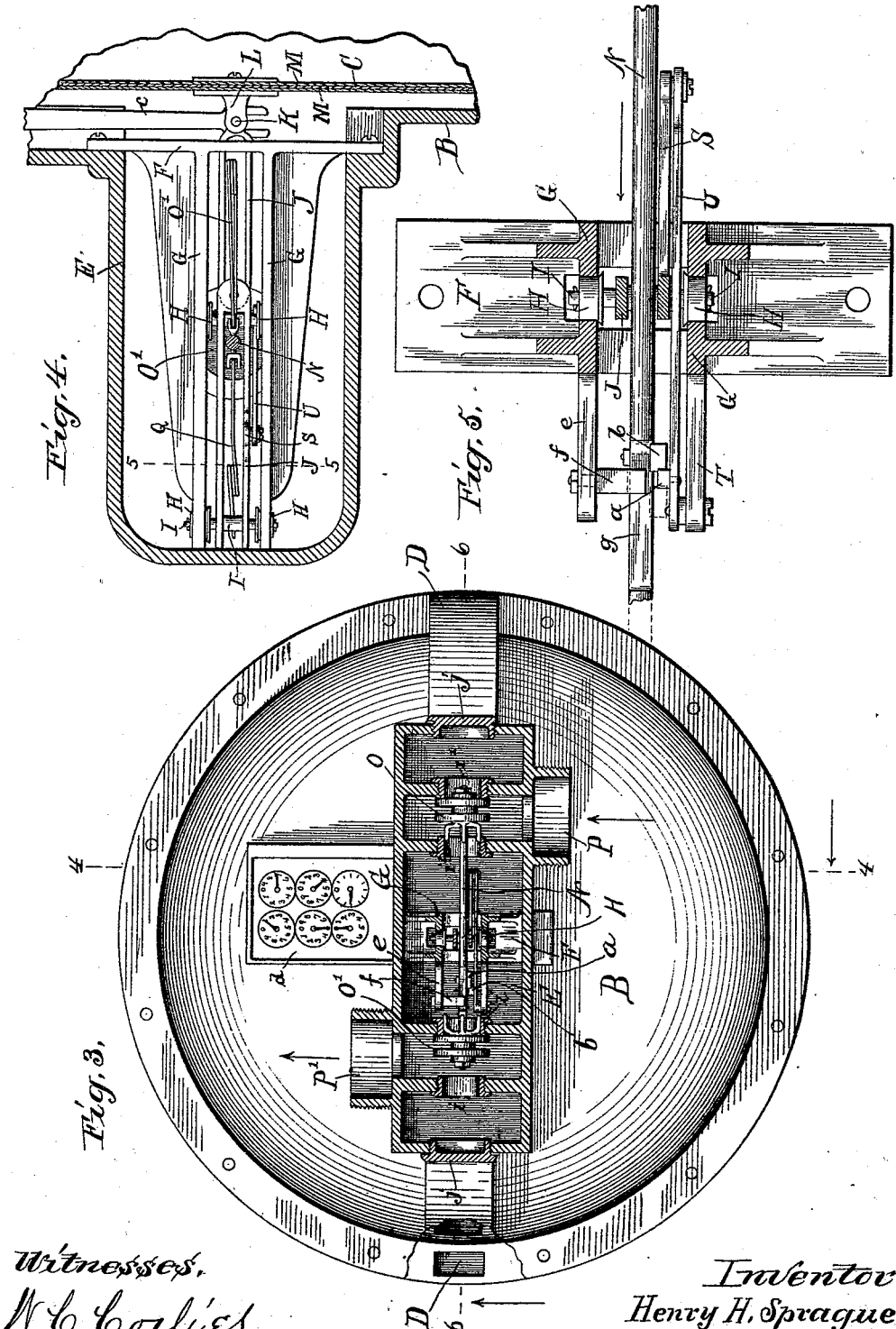

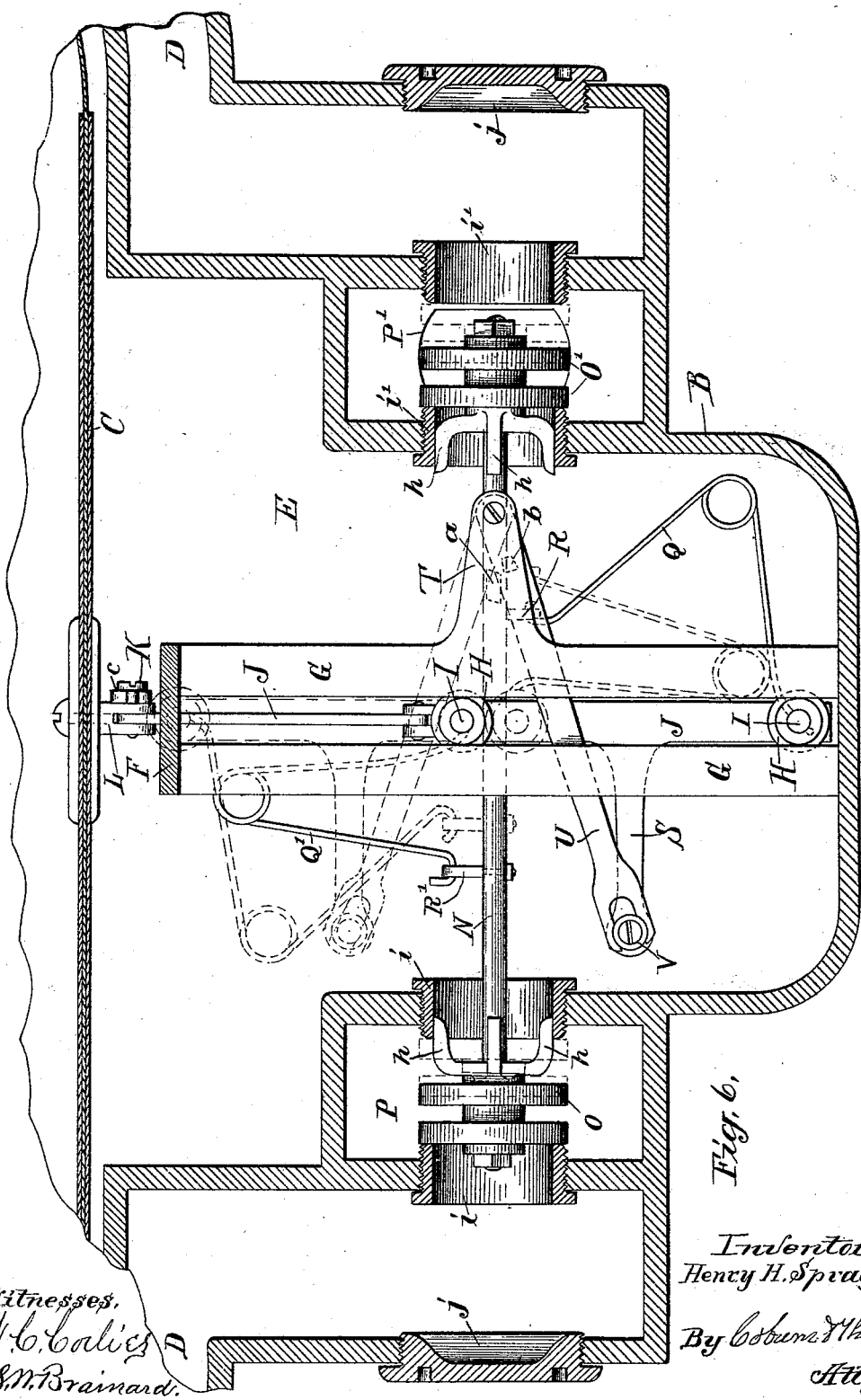

UNITED STATES PATENT OFFICE.

HENRY H. SPRAGUE, OF CHICAGO, ILLINOIS.

GAS-METER.

SPECIFICATION forming part of Letters Patent No. 517,368, dated March 27, 1894.

Application filed December 22, 1892. Serial No. 455,999. (No model.)

*To all whom it may concern:*

Be it known that I, HENRY H. SPRAGUE, a citizen of the United States, residing at Chicago, in the county of Cook and State of Illinois, have invented a certain new and useful Improvement in Gas-Meters, which is fully set forth in the following specification, reference being had to the accompanying drawings, in which—

Figure 2:
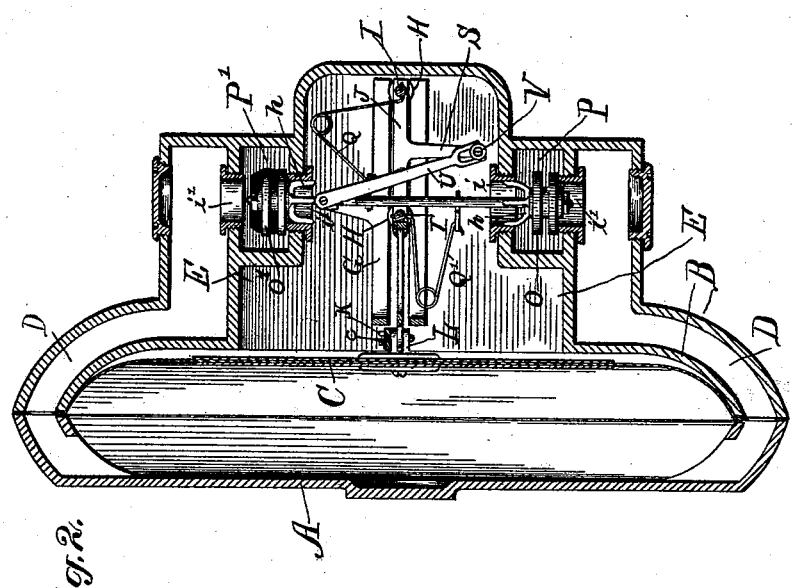
Figure 1:
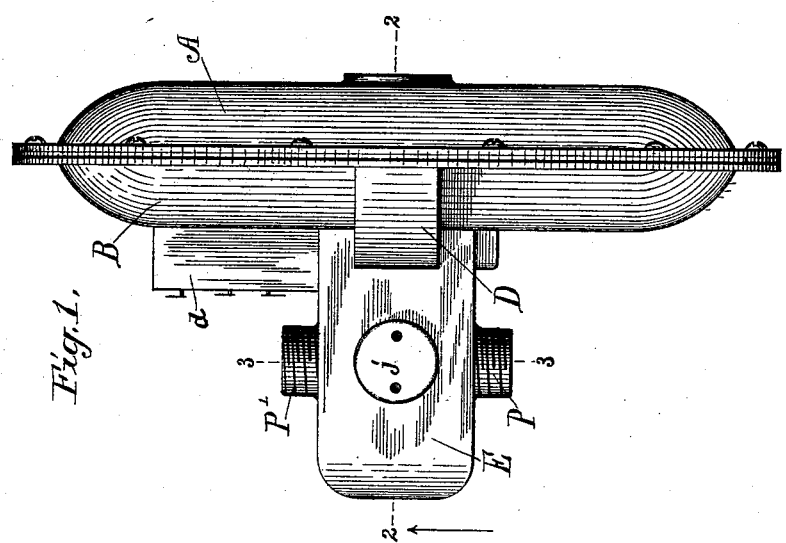

Figure 1 represents a side elevation of my gas meter; Fig. 2, a transverse sectional view, taken at the line 2—2, Fig. 1. Fig. 3 is a sectional view, taken at the line 3—3, Fig. 1, looking to the right, with a portion of one of the by-passes broken away. Fig. 4 is a side elevation of the valve operating mechanism, the wall of the valve-chamber being cut in section. Fig. 5 is a cross-section, taken at the line 5—5, Fig. 4, looking to the right, the valve operating mechanism being detached from the case or chamber; and Fig. 6, is a horizontal, plan section, taken at the line 6—6, Fig. 3, looking in the direction of the arrow.

My invention relates to the construction of meters for measuring the flow of gas or fluid.

The class of meters to which my invention particularly relates, consists of a flexible diaphragm, held between halves of a casing, with by-passes in which the gas passes around the diaphragm.

My invention consists in the construction and operation of certain devices whereby the movement of the diaphragm operates mechanisms which, in turn, operate the valves for the inlet and outflow of gas, all as hereinafter specified and made the subject matter of the claims.

The case of my meter is made in two halves, A and B, which clamp between them the edges of the flexible diaphragm, C.

D—D are by-passes for the gas to pass around the edge of the flexible diaphragm, into that part of the casing of the meter which I have designated by the letter "A."

Attached to half B of the case of the meter, there is a valve-chamber, E.

F, is a base-plate extending across the bottom of the valve-chamber E, and is securely attached thereto, as clearly shown in Fig. 4. This base-plate carries flanged standards, G—G, which serve as guides to the flanged rollers, H—H, that revolve on the axles, I—I, which are carried in the bifurcated rod, J, one end of which is pivoted at K, to the stud, L, which is attached to the flexible diaphragm C and the plates, M. When gas is allowed to pass into that half of the meter case that is designated by B, the flexible diaphragm C is forced toward the half of the case A, which causes the bifurcated rod J and the axles I to move in the guides G toward the half of the case A, until the valves hereinafter described are opened and the gas is allowed to escape from the half of the case B, and the inflowing gas passes around into the half of the case A, which moves the flexible diaphragm C in the opposite direction, carrying with it the bifurcated rod J and the axles I, and the guide-rollers, H.

N, is a valve-stem passing through the guides G, carrying on each end a double-valve, O—O'. One of these valves is placed in the inlet gas-chamber and the other in the outlet gas-chamber, the inlet for gas being shown at P, and the outlet for the gas, at P'.

Q—Q' are springs. One end of each spring is connected to the valve-rod N by hooking through the eye-bolts, R—R', the other ends of each of the springs are attached to the axles I. These springs serve to throw the valve-rod N back and forth, as hereinafter described.

S is an arm rigidly attached to the bifurcated rod, J, so as to move back and forth with it. T, is also an arm, rigidly connected to the standards G, and is stationary.

U, is a vibrating lever, one end of which is pivoted to the end of the arm T, and the other end is bifurcated and straddles the rolling-sleeve, V, on a pin attached to the end of the arm S.

*a* is a block rigidly attached to one side of the valve-rod, N, and *b* is a block or lug attached to one side of the vibrating arm or lever U. The purpose of these two cam-shaped blocks is to prevent the springs Q—Q' from sliding the valve-rod N, and operating the valves until the diaphragm C has made a full throw, moving the bifurcated rod J its entire distance, and bringing the spring which is next to move the rod in full tension. The lug or block *b* passes by one end of the lug or block *a* to hold the valve rod in one direction until it passes entirely by it, when one of the springs slides the valve-rod along, opening the valves at one end of it, and closing it at the other end, when the lug or block *b* passes behind the opposite end of the lug or block *a* and keeps the valve-rod in that position until the diaphragm has made a full throw in the opposite direction, and the block *a* passes by the lug or block *b*, and the other spring, being in full tension, slides the valve-rod in the opposite direction. In this way the double-valve O alternately admits the gas to each side of the diaphragm C, and the valve O' simultaneously opens the outlet passage from each side of the diaphragm to allow the gas to escape from one side of the diaphragm while the inlet gas is being admitted to the opposite side of the diaphragm.

*c* is a lever attached to the stud L and operates the registering mechanism in the registering-box, *d*, in the usual manner. Each vibration of the lever *c* occurs at the discharge of the quantity of gas or other fluid that is admitted to cause one throw of the diaphragm C. The registering mechanism constitutes no part of my invention, and I have not shown it in detail in the drawings. *e* is also an arm attached to one of the flanged standards G and carries a projecting-guide piece, *f*, which lies upon the flattened surface, *g*, of the valve-stem N to keep it from turning, and keep the lugs or blocks *a* and *b* so that they are caused to pass each other in the operation of the machine.

*h—h* are prong-guides attached to the valves O—O', and play back and forth in the valve-seats, *i—i'*, and hold the valves in place as they are vibrated back and forth. The valve-seats *i—i'* are screw-threaded and can be adjusted to regulate the throw of the valve-rod, and can be readily removed and repaired to make the valves fit tightly.

*j—j* are screw-threaded caps covering openings into the valve-chamber through which the valve mechanisms can be reached and removed for repairs, or adjusted without taking the meter apart.

The operation of my meter is as follows: The gas is admitted into the inlet chamber P, from which there are two openings, one leading into one of the by-passes D, through which the gas passes into the half A of the meter, and the other into the chamber E. The double-headed valve O is arranged to close each of these openings, but only one of them at the same time; as shown in Fig. 6, it closes the opening into one of the by-passes D, leaving the opening into the chamber E open, so that the gas will flow into the chamber E; P' is the gas-outlet chamber in which vibrates the double-headed valve O'. This valve, as shown in Fig. 6 closes the opening from this outlet gas-chamber into the chamber E, and opens the opening from this chamber into one of the by-passes D leading from the half A of the meter; so that, as the gas which enters the chamber E moves the diaphragm C, the gas from the half A of the meter escapes into the outlet chamber P', and passes therefrom to be used. As the diaphragm C moves it carries with it the bifurcated rod J, which, by means of the arm S, vibrates the pivoted arm U, which carries the lug or block *b* that is rigidly attached to the pivoted arm U behind the lug or block *a*, which is attached to the valve-rod N and holds the valve-rod N in the position shown in Fig. 6 until the lug *b* passes the lug *a*, which happens when the diaphragm C has made its full throw toward the half A of the meter and carries the bifurcated rod J and the bifurcated arm U into the position shown by the dotted lines in Fig. 6. In this position the spring Q is brought into full tension, and the spring Q' is out of tension, as shown by dotted lines in Fig. 6. When the lug or block *d* has passed the lug or block *a*, the spring Q, being in full tension, immediately throws the valve-rod N, and with it the double-headed valves O and O', causing the valve O to close the opening from the inlet chamber P into the chamber E and open the opening from the inlet chamber P into one of the by-passes D which leads into the half A of the meter, and at the same time causing the double-headed valve O' to close the opening from the outlet chamber P' that opens into one of the by-passes D which leads from the half A of the meter, and opens the opening between the outlet chamber P' and the chamber E. The gas flows to the opposite sides of the diaphragm C and causes it to move back into the position shown in Fig. 6, carrying with it the bifurcated rod J, until it is thrown into the position shown in Fig. 6. The lug *b* passes on opposite sides of the lug *a* from that on which it has previously passed, and holds the valve-stem in position until the diaphragm has made its complete throw when the spring Q' is brought into full tension and vibrates the valve-rod and valves, thereby changing the flow of the inlet and outlet of gas. At each throw of the diaphragm C the register is moved, thereby registering the quantity of gas or other material which passes through the meter. The bifurcated rod J which carries the arm S which vibrates the lever U, is supported on horizontal guides, and is held in a horizontal position, being connected to the vertical diaphragm C. The weight of the operative parts of the meter is supported almost entirely independently of the diaphragm, so that the same pressure of gas upon each side of the diaphragm will vibrate the diaphragm with equal facility, which would not be the case if the diaphragm were horizontal and the operating parts were supported on the diaphragm.

My meter is readily accessible to adjust the operating parts, and I am able to obviate friction of the operating parts sufficiently to have the meter regularly registered with a very low pressure of gas or other fluid.

Having thus described the construction and operation of my invention, what I claim as new, and desire to secure by Letters Patent, is—

1. In a gas meter, the casing composed of two halves with by-passes, one of said halves being provided with a valve-chamber having a gas inlet chamber and a gas outlet chamber, provided with valve-seats; a vertical diaphragm with its edges clamped between the two halves of the meter to be held in a vertical instead of a horizontal position; a horizontal sliding bifurcated rod, one end of which is attached to the center of the vertical diaphragm, and the other end supported in horizontal guides, allowing the diaphragm to vibrate each way with the same facility; a horizontal valve rod parallel with the diaphragm and carrying valves on each of its ends to control the inlet and outlet of gas to and from the meter; two springs connected with the valve rod and with the horizontal rod attached to the diaphragm, by means of which the valve rod is thrown back and forth, opening and closing the valves in the inlet and outlet chambers, as specified, as the diaphragm is vibrated back and forth, all as shown and described.

2. In a gas meter, the valve-chamber E; the guides G; the rod J being pivotally connected to the diaphragm C; the axles I carrying anti-friction rollers in the guides G; the springs Q—Q'; valve-rod N, carrying upon each end double-valves to control the inlet and outlet of gas, and the diaphragm C located at one side of the valve-chamber A and pivotally connected to the rod J to vibrate it within the guides G.

3. In a gas meter, the valve-chamber E having gas inlet and outlet chambers, the valves O—O' controlling the inlet and outlet of gas; the valve-rod N; the vibrating lever U operated by the rod J; lugs or blocks $a$ and $b$; and springs Q—Q', the lugs operating to prevent the throw of the valve-rod until the diaphragm has made its full throw, as specified.

4. In a gas meter, the valve-chamber E located on one side of the diaphragm C; the diaphragm C; the base-plate F extending across the valve-chamber; the guide-standards G rigidly attached to the base-plate; the axles I; the rod J; the anti-friction rollers on the axles, and operating in the guide-standards G to prevent the friction of the parts as the diaphragm is operated.

5. In a gas meter, the valve-stem N carrying eye-bolts R—R'; the springs Q—Q'; the axles I; the rod J carrying the axles and springs Q—Q', one end of each of which is hooked into the eye-bolts, and the other end secured to one of the axles, thus securing the action of the springs alternately to operate the valve-rod and valves, substantially as specified.

HENRY H. SPRAGUE.

Witnesses:
ALOYSIA HELMICH,
MINNIE E. SMITH.